United States Patent
Fogo et al.

[11] Patent Number: 6,142,501
[45] Date of Patent: Nov. 7, 2000

[54] RECREATIONAL VEHICLE JACK REMOTE CONTROL

[76] Inventors: Neil R. Fogo, 29820 Old US 20 W., Elkhart, Ind. 46514; Brian Moore, 341 Pinecroft, Nappanee, Ind. 46550

[21] Appl. No.: 09/425,192

[22] Filed: Oct. 22, 1999

Related U.S. Application Data

[60] Provisional application No. 60/152,927, Sep. 9, 1999.
[51] Int. Cl.$^7$ ............................................. B60S 9/02
[52] U.S. Cl. .................. 280/475; 280/766.1; 254/419; 361/184; 361/189; 307/129
[58] Field of Search ..................... 280/475, 766.1, 280/763.1, 405.1; 254/419, 418, 424, 427; 361/166, 182, 184, 189, 190, 191; 307/129, 125

[56] References Cited

U.S. PATENT DOCUMENTS

| | | | |
|---|---|---|---|
| 3,912,288 | 10/1975 | F'Geppert | 254/86 H |
| 4,253,680 | 3/1981 | Albright et al. | 280/475 X |
| 4,863,184 | 9/1989 | Mena . | |
| 5,004,267 | 4/1991 | Busby . | |
| 5,176,391 | 1/1993 | Schneider et al. . | |
| 5,176,396 | 1/1993 | Hawthorne et al. . | |
| 5,188,379 | 2/1993 | Krause et al. . | |
| 5,299,829 | 4/1994 | Rivers, Jr. et al. . | |
| 5,312,119 | 5/1994 | Schneider et al. . | |
| 5,451,076 | 9/1995 | Burkhead | 280/475 X |
| 5,575,493 | 11/1996 | Schwartz et al. . | |

FOREIGN PATENT DOCUMENTS

2333503   3/1999   United Kingdom .

*Primary Examiner*—J. J. Swann
*Assistant Examiner*—F. Zeender
*Attorney, Agent, or Firm*—Richard C. Litman

[57] ABSTRACT

The recreational vehicle jack remote control is for use with a recreational vehicle having a pair of support jacks which are raised and lowered by an electric motor connected to the jacks. The electric motor is controlled by a normally open, double-pole, triple throw switch in the recreational vehicle. The recreational vehicle jack remote control is a modification of the circuit which includes a portable radio frequency transmitter, at least one radio frequency receiver mounted in the recreational vehicle, and a plurality of relays. The transmitter has an "up" button for raising the support legs, and a "down" button for lowering the support legs. When the "up" button is pressed, the relay coil of at least one relay is energized, closing the relay switch contacts to apply current to the electric motor with the proper polarity for raising the legs. When the "down" button is pressed, the relay coil of at least one relay is energized, closing the relay switch contacts to apply current to the electric motor with the opposite polarity for lowering the legs.

10 Claims, 7 Drawing Sheets

RECREATIONAL VEHICLE JACK REMOTE CONTROL

CROSS-REFERENCE TO RELATED APPLICATION

This application claims the benefit of U.S. Provisional patent application Ser. No. 60/152,927, filed Sep. 9, 1999.

BACKGROUND OF THE INVENTION

1. Field of the Invention

The present invention relates to recreational vehicles and to remote control devices, and particularly to a remote control device for raising and lowering the support legs or jacks of a recreational vehicle.

2. Description of Related Art

Campers and other recreational vehicle trailers may be attached to a towing vehicle by a ball and socket trailer hitch, a gooseneck coupler, or more recently, by a fifth wheel coupling similar to that used by tractors and semitrailers. Particularly with a fifth wheel coupler, it becomes necessary to raise the front end of the tailer to a height sufficient to permit the towing vehicle to back under the kingpin in order to couple the fifth wheel. The front end of the trailer is usually raised by means of jacks which may be powered electrically, pneumatically, or hydraulically. Typically operation of the jack is controlled by an electrical switch mounted in the trailer. If the trailer is not raised to the proper height initially, the user may have to continually leave the towing vehicle to go back and forth to the trailer to raise and lower the height of the jacks to obtain the proper height for connecting the coupler.

Various devices have been proposed to make the process of raising or levelling a trailer less tedious. U.S. Pat. No. 5,299,829, issued Apr. 4, 1994 to Rivers, Jr., et al., describes a pneumatic system for raising and lowering the landing legs on a semitrailer. In one embodiment, the system includes a remote control unit which has a radio receiver which operates solenoids in a landing gear valve to control which air line supplies the pneumatic motor with air to control the direction of rotation of the motor in order to raise or lower the landing gear.

U.S. Pat. No. 5,575,493, issued Nov. 19, 1996 to Schwartz, et al., describes a hydraulic lifting device for a gooseneck tailer. The device uses a remote control unit which is hard-wired to an electric motor a hydraulic pump and a solenoid in a hydraulic valve to control the direction of fluid flow, and hence raising and lowering of the trailer.

U.S. Pat. No. 4,863,184, issued Sep. 5, 1989 to D. Mena, discloses a landing gear mechanism having telescoping legs with locking pins activated by solenoids to lock the legs in position. The legs are operated by an electric motor from a control unit which has relays which activate sensors on the legs which detect if the legs are in locking position. The patent mentions that the control may be activated by remote control, but doesn't teach how this may be accomplished.

U.S. Pat. No. 5,004,267, issued Apr. 2, 1991 to P. V. Busby, teaches a system for raising and lowering the landing gear legs on a semitrailer which uses an air motor supplied with compressed air from the tractor as the power unit for raising and lowering the legs. The control unit is not described.

U.S. Pat. Nos. 5,176,391 and 5,312,119, issued Jan. 5, 1993 and May 17, 1994, respectively, to Schneider, et al., describe a hydraulic leveling system for a recreational vehicle which employs three hydraulic jacks under control of a microprocessor controlled circuit. The system includes a pneumatic air bag system, and indicators to show when the parking brake is released or when the transmission is shifted.

U.S. Pat. No. 5,188,379, issued Feb. 23, 1993 to Krause, et al., shows an automatic leveling system for a recreational vehicle which uses four hydraulic jacks and which has a control pad wired to a microprocessor for controlling the leveling system manually, if desired.

None of the above inventions and patents, taken either singly or in combination, is seen to describe the instant invention as claimed, i.e., a recreational vehicle jack remote control which uses a remote control device which transmits radio waves to a receiver controlling the switch in a circuit which has an electric motor for raising or lowering the jacks for connecting a fifth wheel coupling device.

SUMMARY OF THE INVENTION

The recreational vehicle jack remote control is for use with a recreational vehicle having a pair of support jacks which are raised and lowered by means of an electric motor connected to the jacks. The electric motor is controlled by a normally open, double-pole, triple throw switch in the recreational vehicle. The recreational vehicle jack remote control is a modification of the circuit which includes a portable radio frequency transmitter, at least one radio frequency receiver mounted in the recreational vehicle, and a plurality of relays. The transmitter has an "up" button for raising he support legs, and a "down" button for lowering the support legs. When the "up" button is pressed, the relay coil of at least one relay is energized, closing the relay switch contacts to apply current to the electric motor with the proper polarity for raising the legs. When the "down" button is pressed, the relay coil of at least one relay is energized, closing the relay switch contacts to apply current to the electric motor with the opposite polarity for lowering the legs.

Accordingly, it is a principal object of the invention to provide a recreational vehicle jack remote control device which permits raising and lowering the jacks of a recreational vehicle remotely, instead of a switch at a fixed location.

It is another object of the invention to provide a recreational vehicle jack remote control which utilizes a radio frequency transmitter and received for controlling operation of the recreational vehicle jacks.

It is a further object of the invention to provide a recreational vehicle jack remote control device which may be installed on a recreational vehicle as after market equipment.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
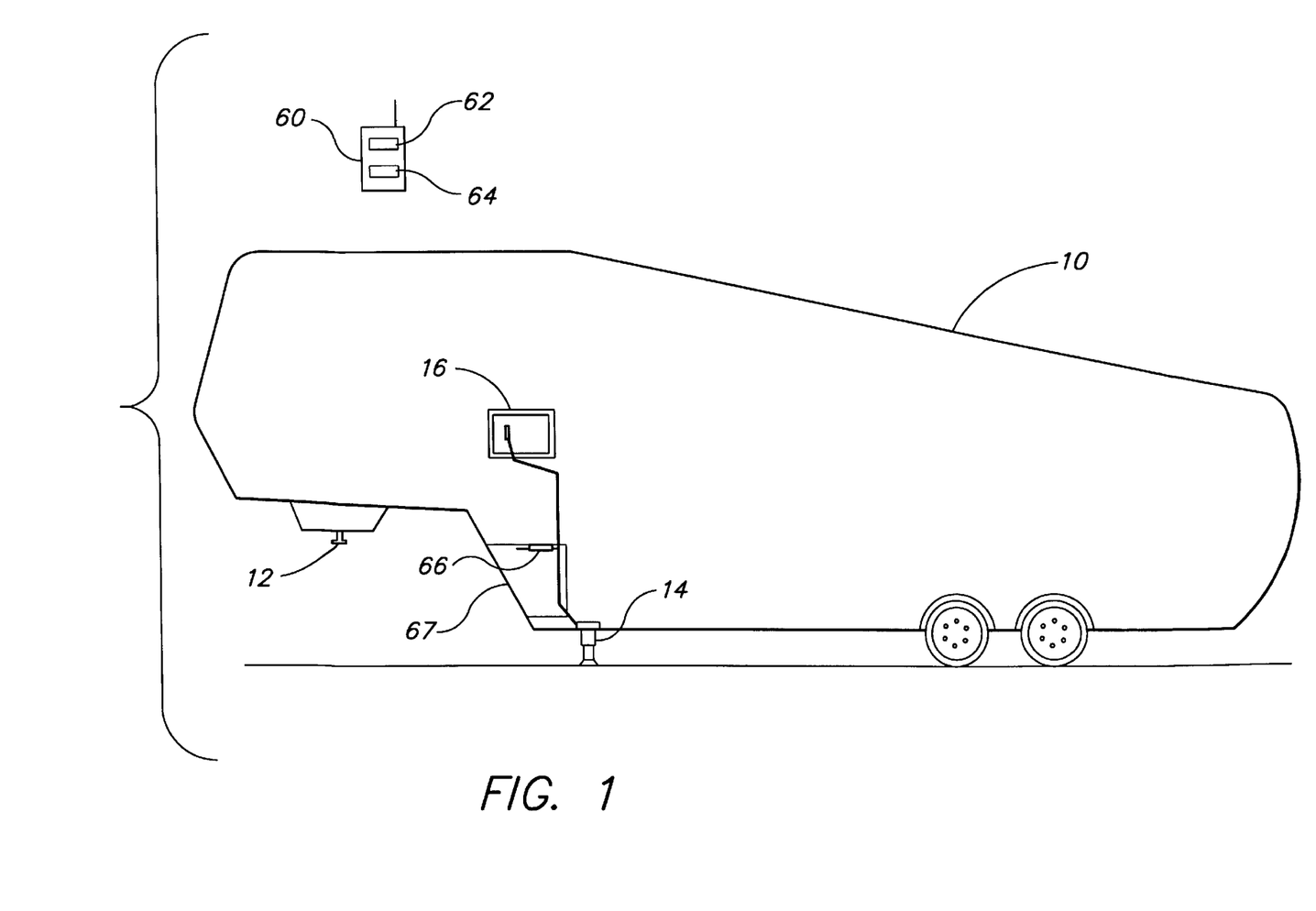
FIG. 1 is a diagrammatic, elevational view of a recreational vehicle jack remote control according to the present invention.

The present invention is a recreational vehicle jack remote control device for controlling he raising and lowering of recreational vehicle jacks to facilitate coupling of a recreational vehicle trailer to a towing vehicle. FIG. 1 is a diagrammatic drawing of a recreational vehicle (RV) trailer 10 equipped with a kingpin 12 for coupling the recreational vehicle to the ring or collar portion (not shown) of a fifth wheel, which may be mounted in the bed of a pickup truck, tractor, or other towing vehicle. Although illustrated in connection with a fifth wheel coupling, it will be understood that the principles of the invention also apply to recreational vehicles equipped with a gooseneck coupler or a socket coupling which mates with a ball hitch on the towing vehicle.

The recreational vehicle 10 includes a pair of jacks 14, sometimes referred to as support legs, on which the RV 10 may be supported when the towing vehicle is detached for independent use. The jacks 14 are commonly raised and lowered with the assistance of pneumatic, hydraulic, or electrical power. Conventionally, the RV trailer 10 is equipped with an electrical switch 16 at a fixed location on or in the recreational vehicle 10 for raising and lowering the jacks 14. The remote control device of the present invention is designed for use with a recreational vehicle having an electric motor attached to each jack 14 for raising and lowering the jacks 14.

Figure 2:
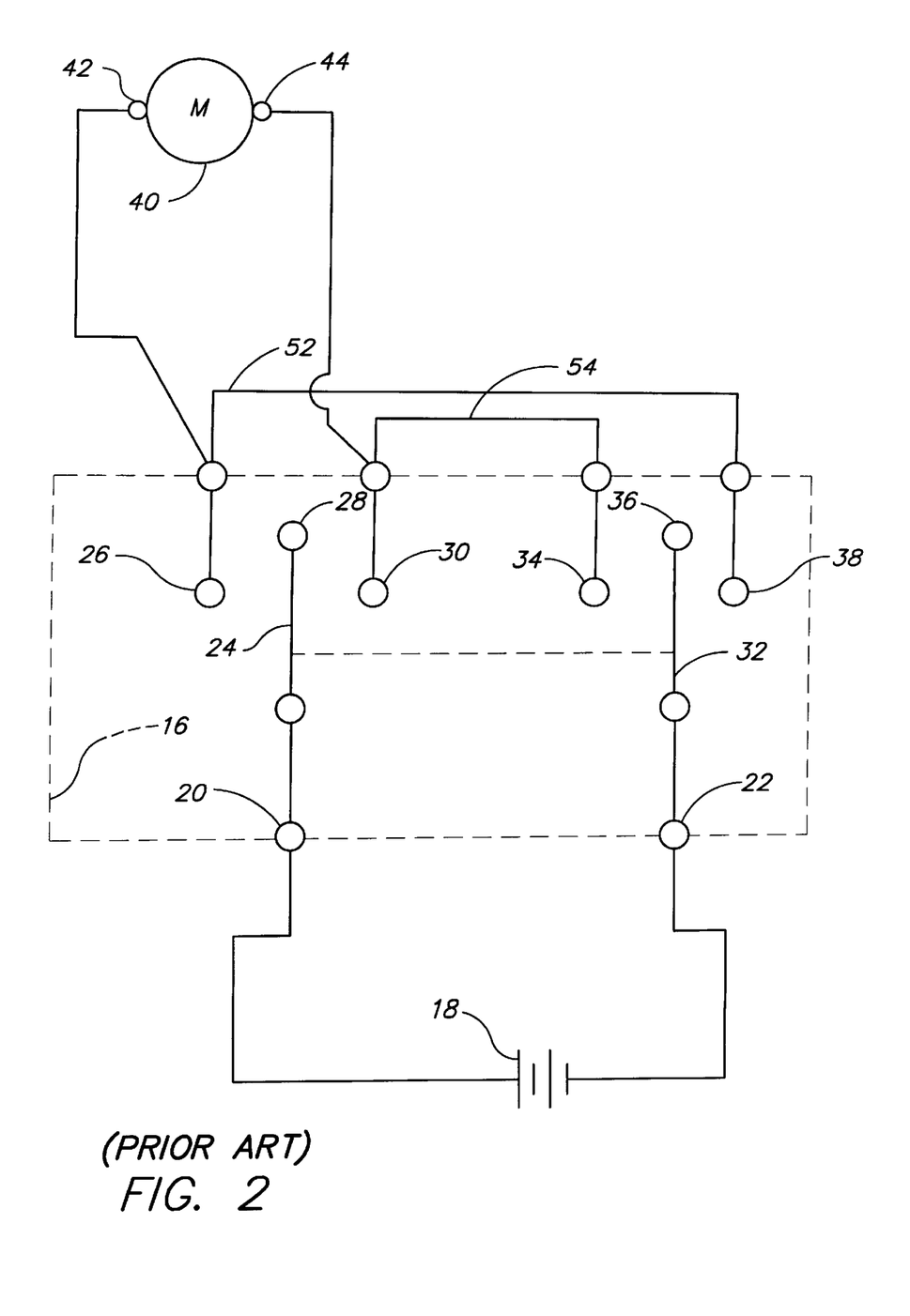
FIG. 2 is a schematic diagram of a conventional circuit for raising and lowering recreational vehicle jacks, the switch being in the normally open position.

A typical circuit for raising and lowering the jacks 14 is shown in FIG. 2. The circuit is usually powered by a twelve volt battery 18 mounted in the trailer 10. The switch shown in FIG. 2 is a normally open, double-pole, triple-throw switch. The switch 16 has a first pole 20 connected to the anode of the battery 18 and a second pole 22 connected to the cathode of the battery 18. The switch 16 is connected to a direct current (DC) motor 40 having a first armature terminal 42 and a second armature terminal 44. The DC motor 40 operates to raise and lower the jacks 14 through appropriate gearing (not shown).

The wiper or moveable blade 24 of the first pole 20 may be switched between one of three contacts or throws, including a first contact 26 connected to the first armature terminal 42, a second contact 28 which is open, and a third contact 30 connected to the second armature terminal 44. Similarly, the moveable blade 32 of the second pole 22 may be switched between one of three contacts or throws, including a fourth contact 34 connected to the second armature terminal 44, a fifth contact 36 which is open, and a sixth contact 38 connected to the first armature terminal 50. A first jumper wire 52 connects first contact 26 with sixth contact 38, and a second jumper wire 54 connects third contact 30 with fourth contact 34.

Figure 3:
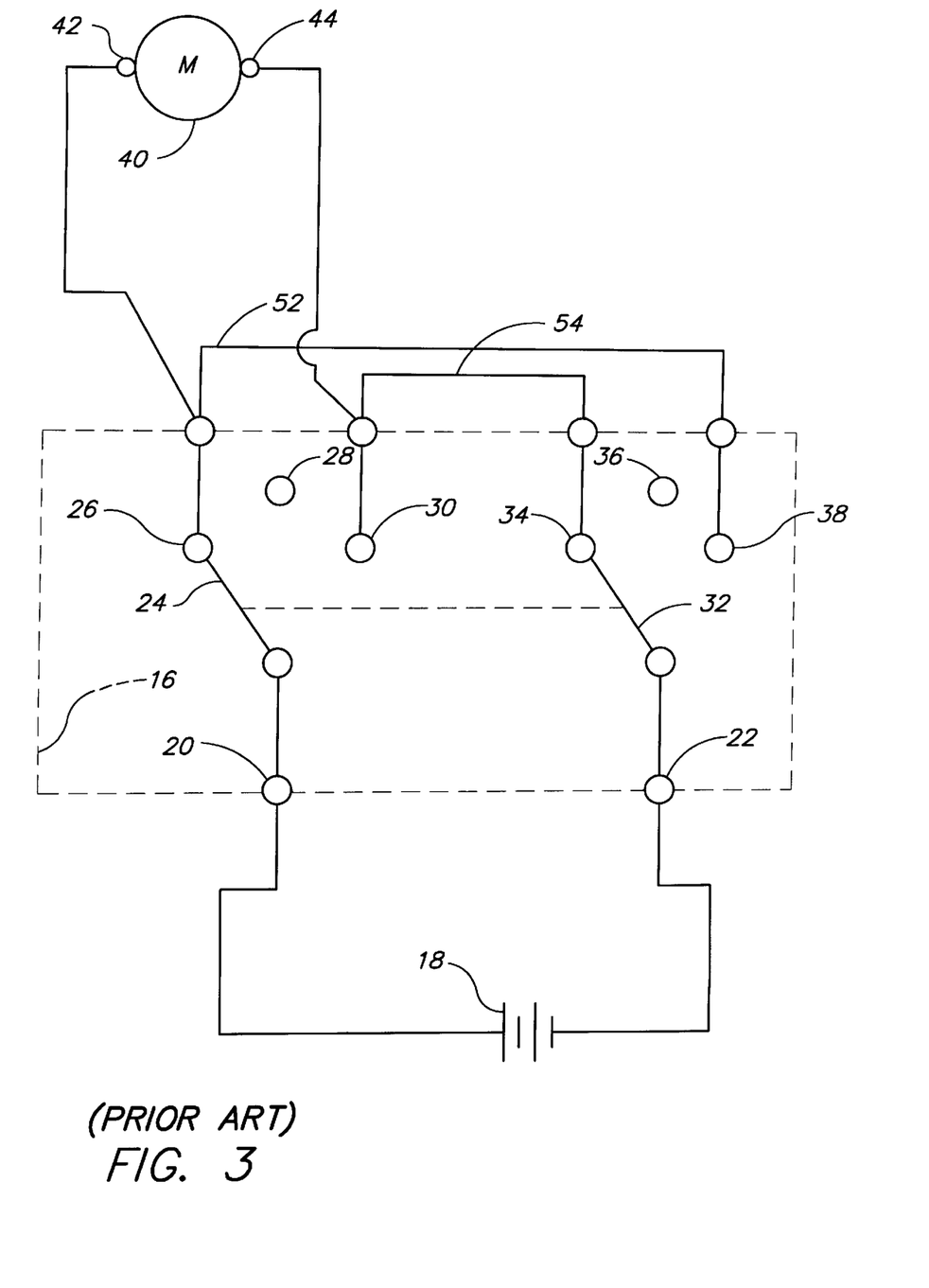
FIG. 3 is a schematic diagram of the circuit of FIG. 2, with the switch being in the "up" position for raising the jacks.

With the blades 24 and 32 in the normally open position, as shown in FIG. 2, no current is applied to the first motor 40. When the switch 16 is moved to an "up" position to raise the jacks 14, as shown in FIG. 3, a positive voltage is applied to first armature terminal 42 via first pole 20, first moveable blade 24, and first contact 26. At the same time, ground is applied to second armature terminal 44 via second pole 22, second moveable blade 32, fourth contact 34, second jumper 54, and third contact 30. With power applied to the motor 40 in the proper polarity, the jacks 14 are raised.

Figure 4:
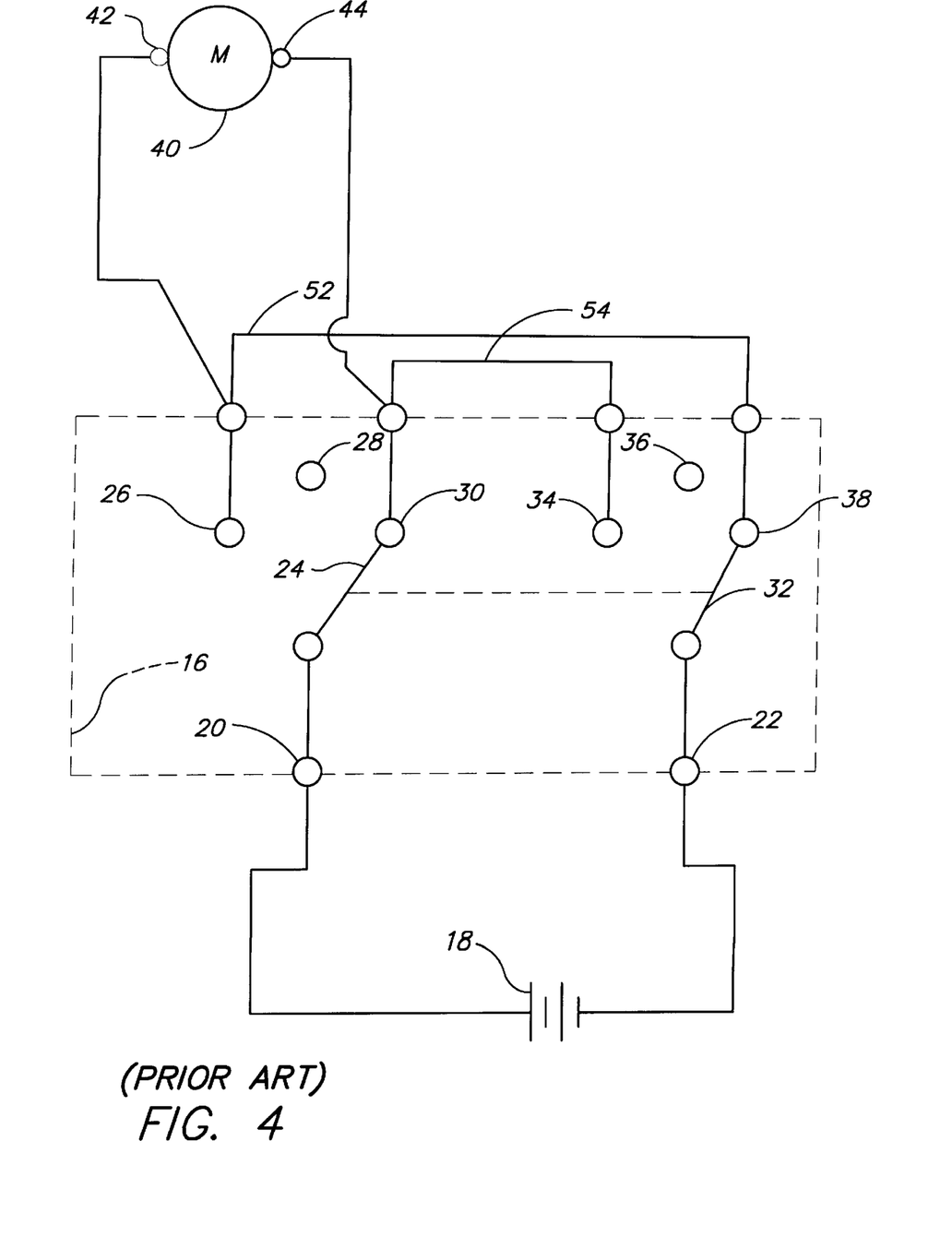
FIG. 4 is a schematic diagram of the circuit of FIG. 2, with the switch being in the "down" position for lowering the jacks.

The jacks 14 may be lowered by reversing the polarity of the current to the armature terminals, as shown in FIG. 4, reflecting the circuit with the switch 16 in a "down" position. With the first moveable blade 24 switched to third contact 30, and second moveable blade 32 switched to sixth contact 38, the polarity of the voltages is reversed, resulting in rotation of the shaft of the motor 40 in the opposite direction to lower the jacks 14. The switch 16 may be a toggle switch made by Carling Electric, Inc.

As shown in FIG. 1, the remote control of the present invention includes a radio frequency transmitter 60 having an "Up" button 62 and a "Down" button 64. A suitable transmitter 60 which may be used for this application is a dual button transmitter model number P-220-2 made by the Heddolf corporation. Although intended for use as a gate opener or garage door opener, this model of transmitter 60 works well in this application.

Figure 5:
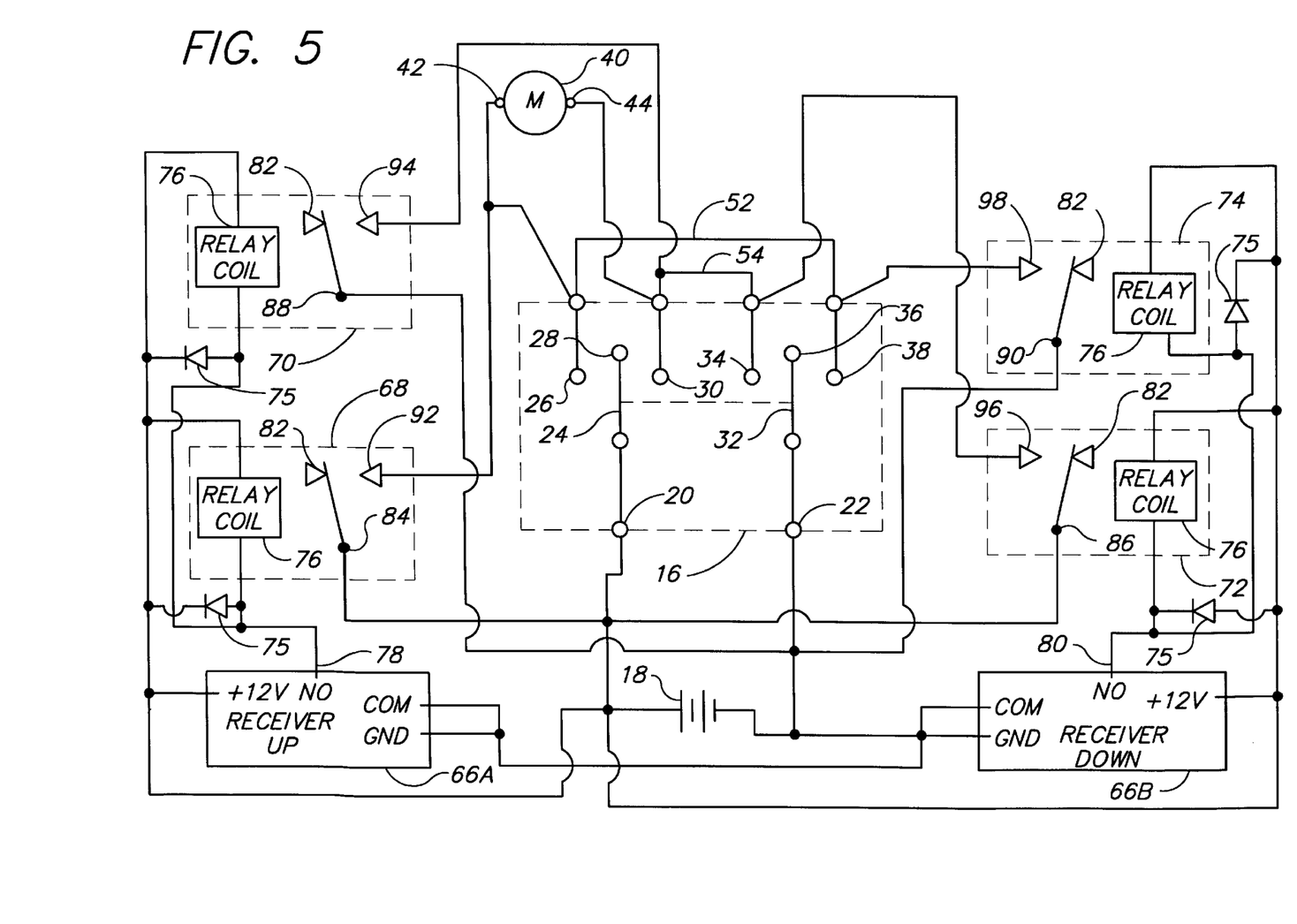
FIG. 5 is a schematic diagram of a circuit according to the present invention for raising and lowering recreational vehicle jacks.
Figure 6:
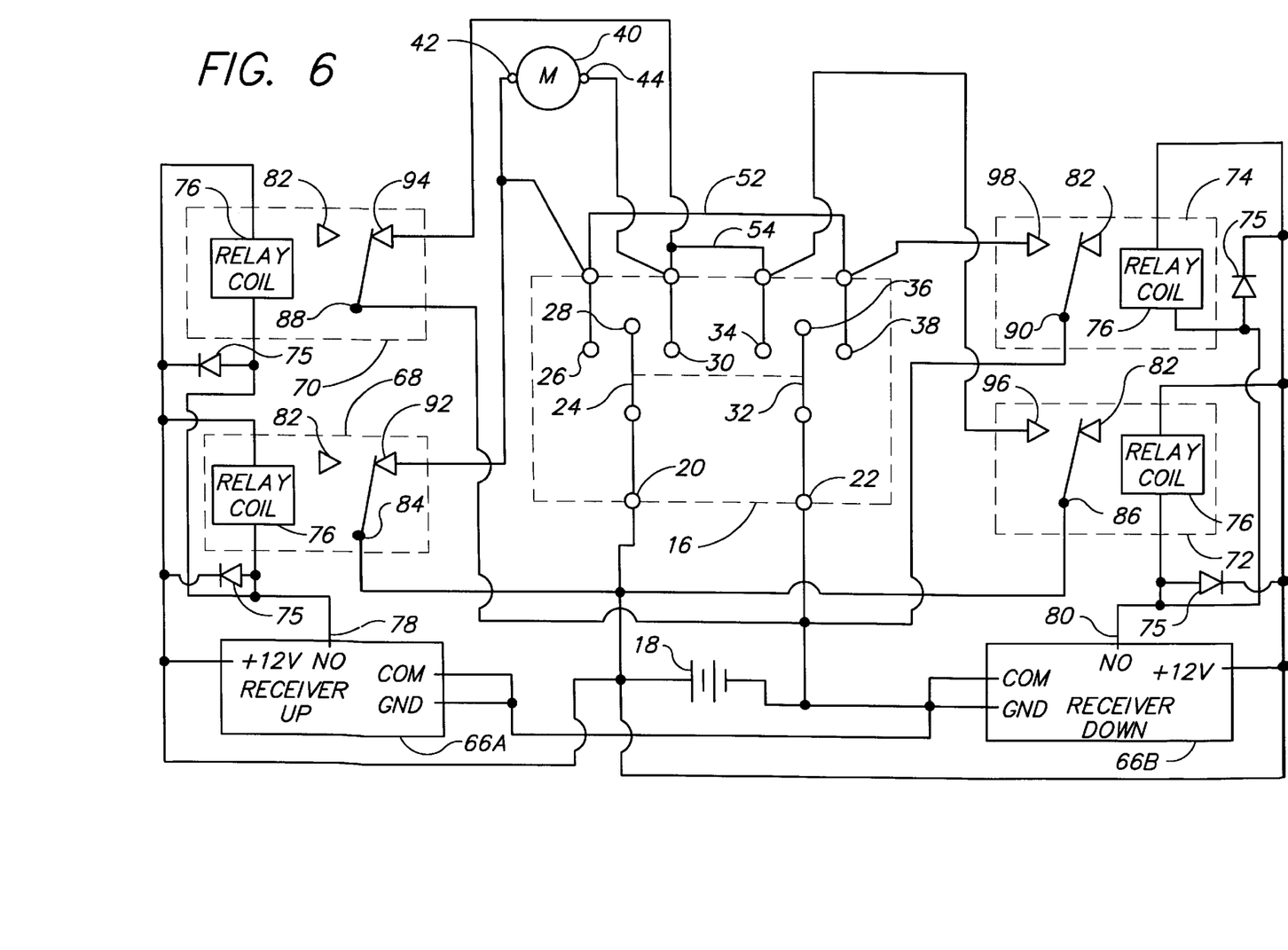
FIG. 6 is a schematic diagram of the circuit of FIG. 5, the "up" button of the transmitter being depressed to raise the jacks.
Figure 7:
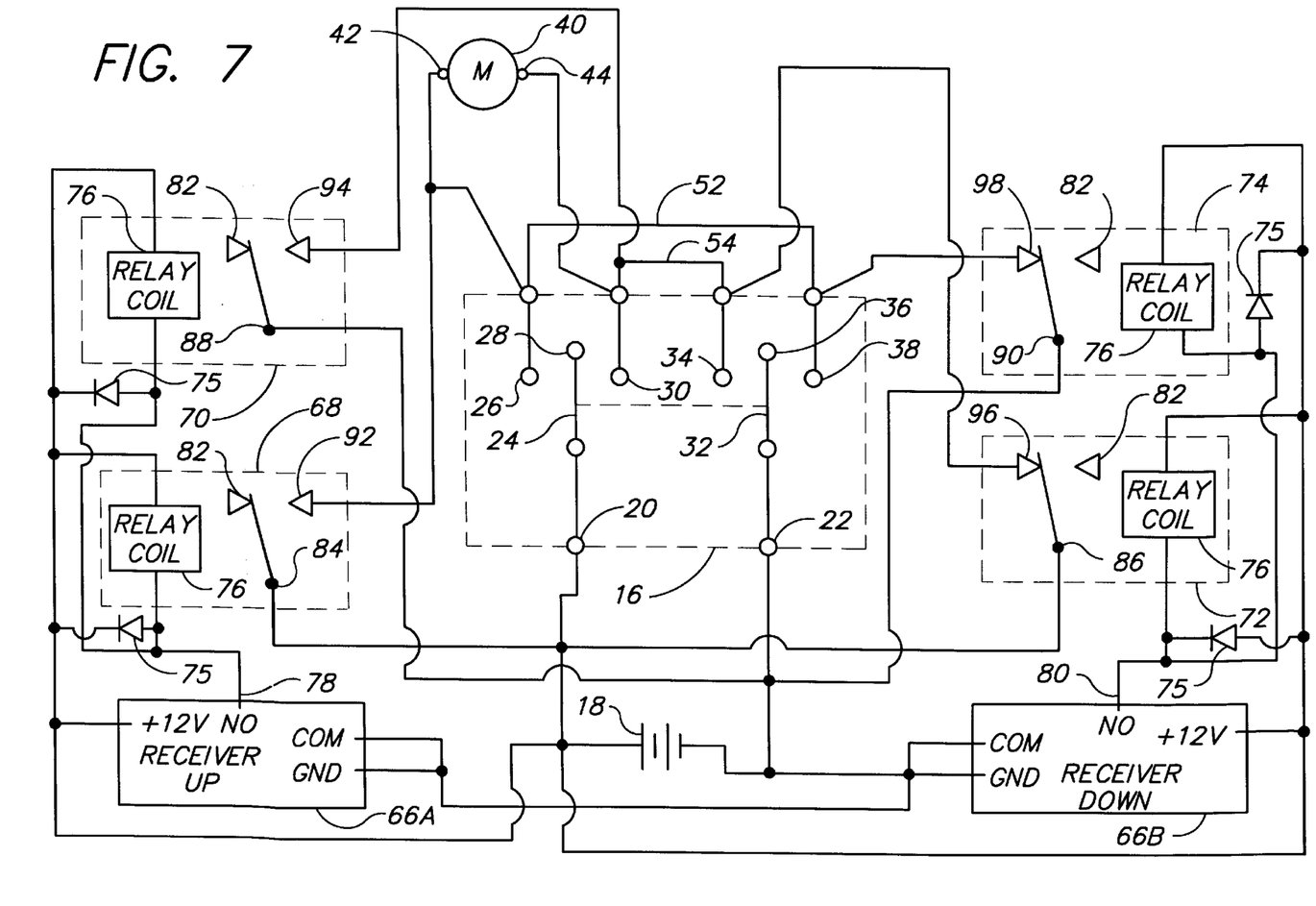
FIG. 7 is a schematic diagram of the circuit of FIG. 5, the "down" button of the transmitter being depressed to lower the jacks.

The remote control also includes at least one radio frequency receiver 66 capable of receiving the frequency or frequencies output of the transmitter 60. The receiver 66 is mounted in the RV 10, and may be mounted in a storage compartment 67 or other location accessible to the witch 16 and motor 40. The receiver 66 may be a single unit capable of receiving signals on two different frequencies, or capable of responding to signals transmitted with separate access tones, or two separate receiving units 66A and 66B may be used, as shown in FIGS. 5 through 7. In the latter case, a receiver which may be used is the model number P-294 made by Heddolf, also intended for use with gate openers or garage door openers. Two such receivers 66A and 66B may be removed from their original enclosures and housed in a suitable container, such as a PolyCase case, part number LP70FMB (not shown).

As shown in FIGS. 5 through 7, the first receiver 66A responds to signals transmitted when the "Up" button 62 is pushed, and the second receiver 66B responds to signals when the "Down" button is pushed. The receivers 66A and 66B are supplied with power from the RV trailer battery 18, so that the receivers 66A and 66B are always on and ready to receive transmissions from the transmitter 60.

In the circuit shown in FIGS. 5 through 7, four normally open, single-pole, double-throw relays are attached to the receivers, including a first 68 and second 70 relay attached to the first receiver 66A, and a third 72 and fourth 74 relay attached to the second receiver 66B. A suitable relay for this application is the Hella 30A relay, part number 66200U. It will be obvious that the four single-pole, double-throw relays may be replaced by two double-pole, double-throw relays of similar current carrying capacity. Each relay 68, 70, 72, and 74 has a relay coil 76 which has a first end connected to the anode of the battery 18. The second end of the relay coil 76 of the first 68 and second 70 relays is connected to a Normally Open (NO) terminal 78 of the first receiver 66A, and the second end of the relay coil 76 of the third 72 and fourth 74 relays are connected to a Normally Open (NO) terminal 80 of the second receiver 66B. A diode 75 may be placed across the ends of the relay coil 76 to clamp down spikes caused by the magnetic fields of the relay coils 76 during collapse of the fields.

One contact 82 of each of the four relays 68, 70, 72 and 74 is open. The pole 84 of the first relay 68 and the pole 86 of the third relay 72 are each connected to the first pole 20 of the switch 16, which is, in turn, connected to the anode of the battery 18. The pole 88 of the second relay 70 and the pole 90 of the fourth relay 74 are connected to the second pole 22 of the switch 16, which is, in turn, connected to the cathode (ground) of the battery 18. The second contact 92 of the first relay 68 is connected to the first contact 26 of the switch 16. The second contact 94 of the second relay 70 is connected to the third contact 30 of the switch 16. The second contact 96 of the third relay 70 is connected to the fourth contact 34 of the witch 16. The second contact 98 of the fourth relay 74 is connected to the sixth contact 38 of the switch 16.

As shown in FIG. 5, when no button is depressed on the transmitter 60, all four of the relays 68, 70, 72 and 74 remain open and no current flows through the motor 40. As shown in FIG. 6, when the "Up" button 62 of the transmitter 60 is depressed, the NO terminal of the first receiver 66A goes to ground and a voltage drop is developed across the relay coils 76 of the first 68 and second 70 relays, closing the contacts. A positive voltage is applied through pole 84, contact 92 and contact 26 to the first terminal of the motor 40. Ground is applied through pole 88, contact 94, and contact 30 to the second terminal 44 of motor 40. Consequently, the motor 40 operates to raise the jacks 14 so long as the "Up" button is pressed. Since the relays 68 and 70 are not latched, the motor 40 stops when the button 62 is released.

As shown in FIG. 7, when the "Down" button 64 is pressed, the NO terminal 80 of the second receiver 66B applies ground to the relay coils 76 of the second 70 and fourth 74 relays, closing the contacts 94 and 98. This results in a voltage of opposite polarity being applied to the motor 40, resulting in lowering the jacks 14. Since the relays 70 and 74 are not latched, the motor 40 stops when the button 64 is released.

It will be apparent from a comparison of FIG. 3 with FIG. 6 and FIG. 4 with FIG. 7 that the remote control of the present invention results in the first 68 and second relays 70 being in parallel with and acting as a jumper around the first 20 and second 22 poles of the witch 16 in order to apply a voltage of the proper polarity to the motor 40 for raising the jacks 14 when the "Up" button 62 is pressed to produce a voltage drop across the relay coils 76, and similarly results in the third 72 and fourth 74 relays being in parallel with and acting as a jumper around the first 20 and second 22 poles of the switch 16 in order to apply a voltage of the proper polarity to the motor 40 for lowering the jacks 14 when the "Down" button 64 is pressed to produce a voltage drop across the relay coils 76. It is intended that the scope of the present claims apply to any particular combination of components which results in one or more relays acting as a jumper around switch contacts in response to a radio frequency signal emanating from a receiver in order to raise or lower the jacks or support legs of an RV trailer or semitrailer. It will also be understood that, according to the present invention, the jacks 14 may operated either by operation of the switch 16 manually, in conventional fashion, or by radio frequency transmitter 60 at the option of the user.

It is to be understood that the present invention is not limited to the sole embodiments described above, but encompasses any and all embodiments within the scope of the following claims.

What is claimed is:

1. A recreational vehicle jack remote control for aftermarket attachment to and use with a recreational vehicle trailer having a pair of jacks for supporting the front of the trailer, at least one electric motor for raising and lowering the jacks, and an electrical control circuit including a switch having an up position for raising the jacks, a down position for lowering the jacks, and an off position, the remote control comprising:

a) a transmitter having an up button and a down button, the transmitter emitting a first radio frequency signal in response to pressing the up button, and emitting a second radio frequency signal in response to pressing the down button;

b) at least one receiver, the at least one receiver being adapted for aftermarket installation in a recreational vehicle trailer by electrical connection to the switch in the recreational vehicle trailer electrical control circuit, the at least one receiver being adapted for receiving said first and second radio frequency signals;

c) at least two relays, each relay having a relay coil electrically connected to said at least one receiver and having a plurality of switchable contacts;

d) wherein the plurality of contacts on said at least two relays is adapted for simultaneously bypassing the contacts of the switch in the recreational vehicle trailer's electrical control circuit in order to apply voltage to the at least one electric motor in a proper polarity for raising the pair of jacks supporting the trailer in response to said first radio frequency signal; and e) wherein the plurality of contacts on said at least two relays is adapted for simultaneously bypassing the contacts of the switch in the recreational vehicle trailer's electrical control circuit in order to apply voltage to the at least one electric motor in a proper polarity for lowering the pair of jacks supporting the trailer in response to said second radio frequency signal.

2. The recreational vehicle jack remote control according to claim 1, wherein said at least one receiver comprises a first receiver and a second receiver.

3. The recreational vehicle jack remote control according to claim 1, wherein said at least one relay comprises a pair of double-pole, double-throw relays.

4. The recreational vehicle jack remote control according to claim 1, wherein said at least one relay comprises four single-pole, double-throw relays.

5. The recreational vehicle jack remote control according to claim 1, further comprising at least two diodes each of said at least two relays having one of the diodes electrically connected across the ends of the relay coil in order to prevent accidental triggering of the switchable contacts.

6. A recreational vehicle jack remote control for raising and lowering the jacks of a recreational vehicle trailer, in combination with a recreational vehicle tailer having an electrically controlled jack system with a pair of jacks for supporting the front of the trailer, each jack being raised and lowered by an electric motor controlled by a switch having an off position, an up position and a down position, the remote control comprising:

a) a transmitter having an up button and a down button, the transmitter emitting a first radio frequency signal in response to pressing the up button, and emitting a second radio frequency signal i response to pressing the down button;

b) at least one receiver, the at least one receiver being adapted for aftermarket installation on the electrically controlled jack system in the recreational vehicle trailer and being adapted for receiving said first and second radio frequency signals;

c) at least two relays, each relay having a relay coil electrically connected to said at least one receiver and having a plurality of switchable contacts;

d) wherein the plurality of contacts on said at least two relays is adapted for simultaneously bypassing the contacts of the switch mounted in the recreational vehicle trailer in order to apply voltage to the at least one electric motor in the proper polarity for raising the pair of jacks supporting the trailer in response to said first radio frequency signal; and e) wherein the plurality of contacts on said at least two relays is adapted for simultaneously bypassing the contacts of the switch in order to apply voltage to the at least one electric motor in the proper polarity for lowering the pair of jacks supporting the recreational vehicle trailer in response to said second radio frequency signal.

7. The recreational vehicle jack remote control according to claim 6, wherein said at least one receiver comprises a first receiver and a second receiver.

8. The recreational vehicle jack remote control according to claim 6, wherein said at least one relay comprises a pair of double-pole, double-throw relays.

9. The recreational vehicle jack remote control according to claim 6, wherein said at least one relay comprises four single-pole, double-throw relays.

10. The recreational vehicle jack remote control according to claim 6, further comprising at least two diodes each of said at least two relays having one of the diodes electrically connected across the ends of the relay coil in order to prevent accidental triggering of the switchable contacts.

* * * * *